US012585325B2

(12) United States Patent
Shtybel et al.

(10) Patent No.: US 12,585,325 B2
(45) Date of Patent: Mar. 24, 2026

(54) TRACKING USER FOCUS

(71) Applicant: Sphere Research Ltd, London (GB)

(72) Inventors: Yuriy Shtybel, London (GB); Marian Faryna, London (GB); Ihor Solomakin, London (GB); Vitaliy Kravchenko, London (GB); David Parker, London (GB)

(73) Assignee: Sphere Research Ltd, London (GB)

( * ) Notice: Subject to any disclaimer, the term of this patent is extended or adjusted under 35 U.S.C. 154(b) by 0 days.

(21) Appl. No.: 18/645,841

(22) Filed: Apr. 25, 2024

(65) Prior Publication Data

US 2024/0272706 A1    Aug. 15, 2024

Related U.S. Application Data

(63) Continuation of application No. PCT/GB2022/052747, filed on Oct. 28, 2022.

(30) Foreign Application Priority Data

Oct. 28, 2021    (GB) ...................................... 2115507

(51) Int. Cl.
   *G06F 3/01*         (2006.01)
   *G06T 19/00*        (2011.01)
(52) U.S. Cl.
   CPC .............. *G06F 3/011* (2013.01); *G06T 19/00* (2013.01); *G06T 2210/36* (2013.01)
(58) Field of Classification Search
   CPC ................................................. G06F 3/04815
   See application file for complete search history.

(56) References Cited

U.S. PATENT DOCUMENTS 9,674,590 B2 *   6/2017   Park ......................... H04Q 9/00
10,614,616 B1    4/2020   Tedesco et al.
                 (Continued)

FOREIGN PATENT DOCUMENTS

WO     2011151367 A1    12/2011
WO     2020208302 A1    10/2020
WO     2022003066 A1    1/2022

OTHER PUBLICATIONS

International Search Report and Written Opinion dated Dec. 14, 2022 for PCT Application No. PCT/GB2022/052747.
(Continued)

*Primary Examiner* — Bipin Gyawali
(74) *Attorney, Agent, or Firm* — EIP US LLP

(57) ABSTRACT

A data processing system for tracking user focus in a digital environment includes communication means arranged to receive, from each of a plurality of user devices, input data indicating one or more user actions performed via the user device while the user device renders, from a perspective of a virtual camera controlled by said one or more user actions, a three-dimensional model commonly provided to the plurality of user devices. The received input data further indicates, for each user action, a focal position on the three-dimensional model relating to a position and/or orientation of the virtual camera relative to the three-dimensional model following the user action. The data processing system further comprises processing means arranged to determine, using the received input data, a spatial distribution of user focus on the three-dimensional model, in dependence on the indicated focal positions for the respective user actions.

18 Claims, 7 Drawing Sheets

(56)         References Cited

U.S. PATENT DOCUMENTS

| | | | |
|---|---|---|---|
| 11,769,496 B1* | 9/2023 | Prasad | .................... G10L 15/22 |
| | | | 704/257 |
| 2012/0166833 A1* | 6/2012 | Iwai | ...................... G06F 1/3206 |
| | | | 713/320 |
| 2015/0062020 A1* | 3/2015 | Pourbigharaz | ........ G06F 3/0416 |
| | | | 345/173 |
| 2015/0193032 A1* | 7/2015 | Saxena | ................. G06F 1/1694 |
| | | | 345/173 |
| 2015/0277539 A1* | 10/2015 | Chueh | .................... G09G 5/003 |
| | | | 345/173 |
| 2018/0276894 A1 | 9/2018 | Chang et al. | |
| 2020/0104030 A1* | 4/2020 | Dedual | .............. G06F 3/04815 |
| 2020/0272324 A1* | 8/2020 | Chanda | .............. G06F 3/04883 |
| 2020/0402094 A9* | 12/2020 | LaMontagne | ....... G06F 3/04817 |
| 2022/0172442 A1* | 6/2022 | Ruokonen | ........... G06F 3/04815 |
| 2023/0099605 A1* | 3/2023 | Georgis | ................. G06T 9/001 |
| | | | 345/420 |

OTHER PUBLICATIONS

GB Search Report dated Jun. 16, 2022 for GB Application No. GB2115507.2.

* cited by examiner

User device

Server system

Render three-dimensional model — 602

Receive user actions — 604

Generate user action data — 606

Transmit user action data

608

Receive user action data — 610

Determine distribution of user focus

612

Delete user action data

614

TRACKING USER FOCUS

CROSS-REFERENCE TO RELATED APPLICATIONS

This application is a continuation under 35 U.S.C. § 120 of International Application No. PCT/GB2022/052747, filed Oct. 28, 2022, which claims priority to GB Application No. GB 2115507.2, filed Oct. 28, 2021, under 35 U.S.C. § 119(a). Each of the above-referenced patent applications is incorporated by reference in its entirety.

BACKGROUND

Technical Field

Embodiments disclosed herein relate to tracking user focus in a digital environment.

Background

Tracking the focus of users browsing a website can be used to gain valuable insights into how much interest there is in items displayed on the website, for example products in the case of an online retail website, as well as to evaluate site performance and other potentially valuable metrics. Existing approaches include tracking the number of times an individual webpage is visited (referred to as the number of pageviews), recording the number and locations of clicks, and tracking the position of a cursor. In the latter approach, the location of the cursor is assumed to be a centre of the user's focus, enabling a map of user focus across the webpage to be generated.

The use of a cursor position as a proxy for user focus may be of limited efficacy in certain settings, for example in the case of touch screen input devices. Furthermore, existing approaches may not properly capture all of the available information about user focus during browsing.

SUMMARY

According to a first aspect, there is provided a data processing system for tracking user focus in a digital environment. The data processing system includes communication means arranged to receive, from each of a plurality of user devices, input data indicating one or more user actions performed via the user device while the user device renders, from a perspective of a virtual camera controlled by said one or more user actions, a three-dimensional model commonly provided to the plurality of user devices. The received input data further indicates, for each user action, a focal position on the three-dimensional model relating to a position and/or orientation of the virtual camera relative to the three-dimensional model following the user action. The data processing system further includes processing means arranged to determine, using the received input data, a spatial distribution of user focus on the three-dimensional model, in dependence on the indicated focal positions for the respective user actions.

Determining the spatial distribution of user focus based on the position/orientation of the virtual camera makes use of the fact that in an interactive three-dimensional environment, the user has freedom to position the virtual camera such that the areas of most interest are most clearly visible. Tracking focal positions relating to the position/orientation of the virtual camera can therefore be used to estimate the areas of most interest to the user. Such tracking is agnostic of the type of input device on which the user input actions are performed, allowing data to be collected from large numbers of users, potentially using different types of input devices, irrespective of the types of input devices used.

The communication means may be arranged to receive viewport data indicating viewport dimensions of each of the plurality of user devices. The processing means may then be further arranged to determine said spatial distribution of user focus in dependence on the indicated viewport dimensions of each of the plurality of user devices. In this way, the contribution of a given user device to the distribution is made to depend on the size, aspect ratio and orientation of the user device on which the three-dimensional model is rendered. These factors may vary significantly between, for example, a smartphone, a tablet computer, a laptop computer, and a smart TV. Since these factors affect what is actually seen by the user viewing the rendered model, such information can be used to refine the distribution of user focus, for example by affecting the size and shape of the area over which the user focus is determined to be located.

For at least one user device, the input data may include data indicative of time periods between successive user actions. The processing means may then be arranged to determine the spatial distribution of user focus in dependence on said time periods between successive user actions. In cases where the virtual camera remains a given position/orientation following a user input action, enabling the user to view a corresponding portion of the rendered model, the duration of time before another user input action is performed may be indicative of the level of interest the user has in that portion of the rendered model. The focus level may be considered to increase with time, for example proportionally up to a predetermined saturation time (at which point it is no longer assumed that the user is still viewing the model).

For at least one user device, the input data may include data indicative of a zoom level following the performance of a given user action. The processing means may be arranged to determine said spatial distribution of user focus in dependence the indicated zoom level following the performance of the given user action. The contribution of a given user action to the spatial distribution may therefore be made to depend on how much of the model is visible in the viewport following the user action.

The three-dimensional model may have a concave interior surface, and the indicated focal position for a given user action may be at a point on the concave interior surface. The concave interior surface gives the impression of wrapping around the virtual camera, allowing a larger number of objects to be observed within the field of view of the virtual camera than for equivalently-sized objects in two-dimensions. For a given position and orientation of the virtual camera, the concave interior surface may include a natural point or region of maximum visibility from the perspective of the virtual camera, for example a point or region at which the surface faces directly towards the virtual camera or at which an angle between normal of the surface and the virtual camera is minimum. This is a natural position at which the user will place items of interest when viewing the rendered model, and can therefore be equated with the focal position following a given user action. The focal position for a given user action may for example be an intersection between a surface of the three-dimensional model and an axis of the virtual camera. This point will fall within the centre of the viewport, and depending on the nature of the algorithm for moving the virtual camera, may appear at normal incidence to the virtual camera.

The plurality of user actions may include one or more of a zoom action in which a field of view and/or distance of the virtual camera from the three-dimensional model is adjusted, and a move action in which a position and/or orientation of the virtual camera relative to the three-dimensional model is adjusted. For example, a user input action may be a rotational move action in which the virtual camera rotates around an axis, in which case the input data may indicate a direction of the rotation. In the case of a rotation, the specification of direction allows the system to distinguish between different rotations that can result in the same focal position.

A plurality of objects may be positioned on the three-dimensional model when the three-dimensional model is rendered by the plurality of user devices. The objects may for example represent selectable products, with the three-dimensional model acting as an online shopping environment. The processing means may be arranged to determine respective attention values for objects of the plurality of objects based on the determined spatial distribution of user focus on the three-dimensional model, providing valuable insights to retailers or other parties. Alternatively, or additionally, the plurality of objects may be positioned in an initial configuration. The processing means may then be arranged to determine a modified configuration of the plurality of objects on the three-dimensional model using the determined spatial distribution of user focus on the three-dimensional model, and transmit data to one or more of the plurality of user devices, via the communication means, indicating the updated configuration of the plurality of objects for rendering on said one or more of the plurality of input devices. In this way, the objects on the three-dimensional model are dynamically rearranged in dependence on the user focus. This may be used, for example, to push interest in certain objects (such as products) by placing them near objects which receive a high degree of user focus.

The three-dimensional model may include multiple levels of detail associated with respective different fields of view of the virtual camera, and the processing means may be arranged to determine the attention values in dependence on levels of detail rendered by the respective user devices following the indicated user actions. Different levels of detail may enable different objects to be viewed on the three-dimensional model, in which case the determined attention values may take into account what can be actually viewed at a given level of detail.

The processing means may be arranged to determine a plurality of spatial distributions of user attention on the three-dimensional model over respective different periods of time, and to aggregate the plurality of spatial distributions over the respective periods of time to generate one or more time-aggregated spatial distributions of user attention on the three-dimensional model. The different aggregation periods may include, for example, hours, days, weeks and months, from which various insights can be gained, for example relating to variation of user attention at particular times, such as particular times of day, particular days of the week, or when specific events take place.

The processing means may be arranged to delete the input data after determining the spatial distribution of user focus on the three-dimensional model. For large numbers of users, the amount of input data, indicating every user action performed by every user, may be very large. The distribution data, which may be stored for example in a relational database, can be made far more compact, and contains all of the relevant information conveyed by the input data.

The data processing means may be arranged to transmit the three-dimensional model to each of the plurality of user devices via the communication means. A new or updated three-dimensional model is thereby commonly provided to all of the user devices such that user focus can be measured for the new model.

According to further aspects, there are provided a computer-implemented method, a non-transient storage medium comprising computer-readable instructions for carrying out the method, and a data processing system comprising one or more processors and a memory comprising computer-readable instructions for carrying out the method. The method includes receiving, from each of a plurality of user devices, input data indicating one or more user actions performed via the user device while the user device renders, from a perspective of a virtual camera controlled by said one or more user actions, a three-dimensional model commonly provided to the plurality of user devices. The received input data further indicates, for each user action, a focal position on the three-dimensional model relating to a position and/or orientation of the virtual camera relative to the three-dimensional model following the user action. The method further includes determining, using the received user data, a spatial distribution of user focus on the three-dimensional model, in dependence on the indicated focal positions associated with the respective user actions.

According to a further aspect, there is provided a computing device. The computing device includes a rendering engine for rendering a three-dimensional model on a display from a perspective of a virtual camera, one or more input devices for receiving user actions for controlling the virtual camera, and processing means for generating user action data indicating one or more user actions received by the one or more input devices while the three-dimensional model is rendered on the display. The user action data indicates, for each user action, a focal position on the three-dimensional model relating to a position and/or orientation of the virtual camera relative to the three-dimensional model following the performing of the respective user action. The computing device further includes communication means for transmitting the user action data to a remote system for use in determining a spatial distribution of user focus on the three-dimensional model by users of a plurality of computing devices to which the three-dimensional model is commonly provided.

According to further aspects, there are provided a computer-implemented method, a non-transient storage medium comprising computer-readable instructions for carrying out the method, and a data processing system comprising one or more processors and a memory comprising computer-readable instructions for carrying out the method. The method includes rendering a three-dimensional model on a display from a perspective of a virtual camera, receiving, from one or more input devices, a plurality of user actions for controlling the virtual camera while the three-dimensional model is rendered on the display, and generating user action data indicating one or more user actions received by the one or more input devices while the three-dimensional model is rendered on the display. The user action data indicates, for each user action, a focal position on the three-dimensional model relating to a position and/or orientation of the virtual camera relative to the three-dimensional model following the performing of the respective user action. The method further includes transmitting the user action data to a remote system for use in determining a spatial distribution of user attention on the three-dimensional model by users of a plurality of computing devices to which the three-dimensional model is commonly provided.

According to a further aspect, there are provided a computer-implemented method, a non-transient storage medium comprising computer-readable instructions for carrying out the method, and a data processing system comprising one or more processors and a memory comprising computer-readable instructions for carrying out the method. The method includes receiving, from each of a plurality of user devices, input data indicating one or more user actions performed via the user device while the user device renders, from a perspective of a virtual camera controlled by said one or more user actions, a three-dimensional model commonly provided to the plurality of user devices, wherein the received input data further indicates, for each user action, a focal position on the three-dimensional model relating to a position and/or orientation of the virtual camera relative to the three-dimensional model following the user action; and determining, using the received input data, impression data indicating a number of impressions of a first object of the plurality of objects, based at least in part on the indicated focal positions for the respective user actions. Determining the impression data may include incrementing an impression count upon determining, based at least in part on the indicated focal positions for the respective user actions, that a predetermined set of viewability characteristics are satisfied for one of the plurality of user devices.

Further features and advantages of the invention will become apparent from the following description of preferred embodiments of the invention, given by way of example only, which is made with reference to the accompanying drawings.

DETAILED DESCRIPTION

Details of systems and methods according to examples will become apparent from the following description with reference to the figures. In this description, for the purposes of explanation, numerous specific details of certain examples are set forth. Reference in the specification to 'an example' or similar language means that a feature, structure, or characteristic described in connection with the example is included in at least that one example but not necessarily in other examples. It should be further noted that certain examples are described schematically with certain features omitted and/or necessarily simplified for the ease of explanation and understanding of the concepts underlying the examples.

Embodiments of the present disclosure relate to tracking user focus in a digital environment. In particular, embodiments described herein address challenges related to the accurate and efficient tracking of user focus for a potentially large number of users, each having potentially different types of user devices, in a common digital environment.

Figure 1:
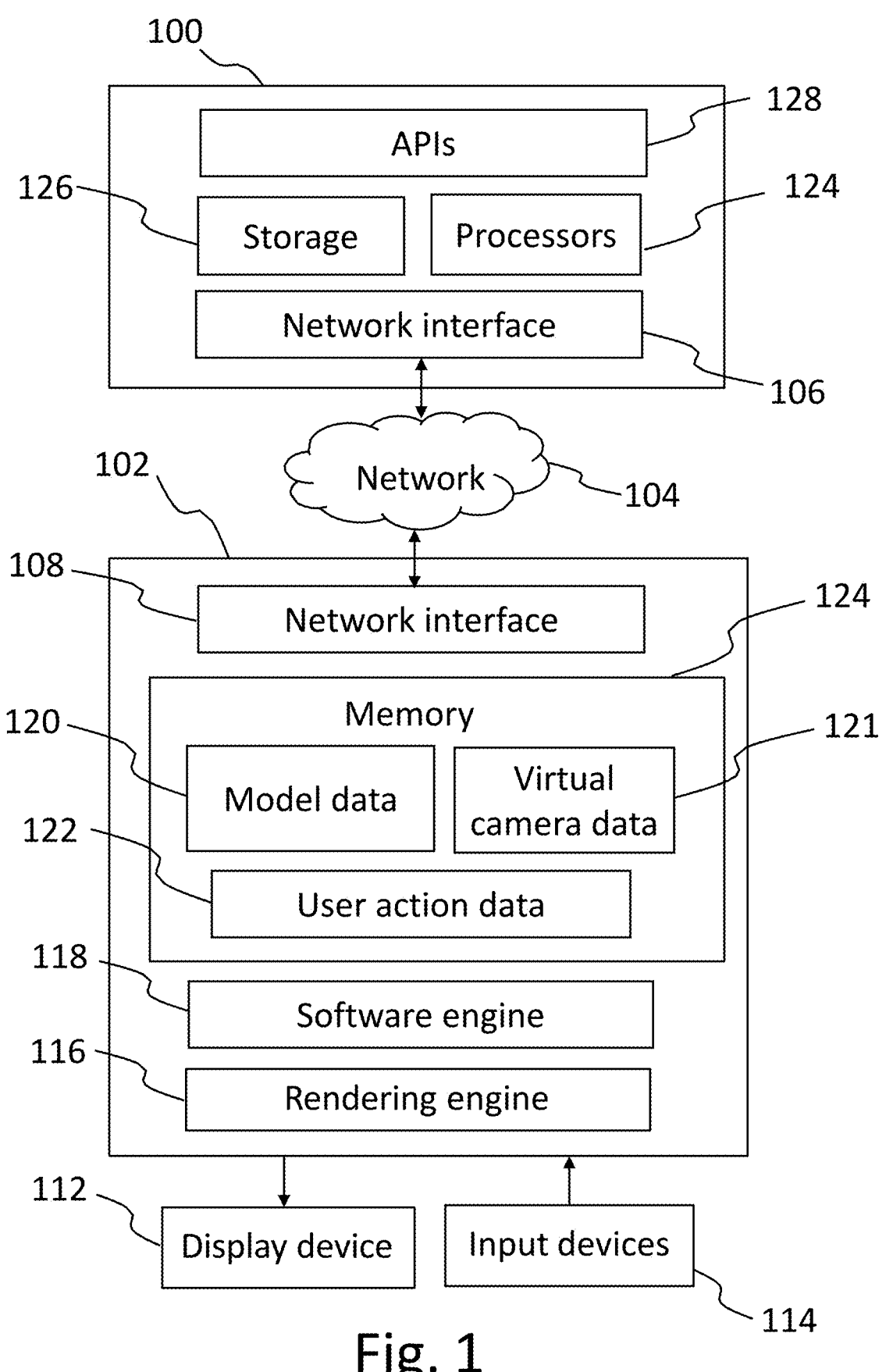
FIG. 1 shows schematically an example of a system for tracking user focus in a digital environment.

FIG. 1 schematically shows functional components of a data processing system 100 and a user device 102 arranged to communicate with one another over a network 104 via respective network interfaces 106, 108. The various functional components shown in FIG. 1 may be implemented using software, hardware, or a combination of both.

The user device 102 can be any electronic device capable of outputting a video signal to a display device 112 in dependence on user input received from one or more input devices 114. The video signal typically includes a three-dimensional model rendered in real time by a rendering engine 116, for example using rasterization-based rendering techniques and/or ray tracing techniques. The user device 102 may for example be a personal computer (PC), a laptop computer, a tablet computer, a smartphone, a games console, a smart TV, a virtual/augmented reality headset with integrated computing hardware, or a server system arranged to provide cloud-based services to remote users.

The network interface 108 of the user device 102 includes communication means for transmitting and receiving data over the network 104. The communication means may include a wireless transceiver, a modem, and/or wired connection means. The network may include a core data packet network and, optionally, a radio access network. For example, the user devices 102 may transmit data over a Wi-Fi or cellular connection or over a wired ethernet connection. In particular, the user device 102 is arranged to transmit user action data to the data processing system 100 indicating user actions performed via the input devices 114. The user action data may be transmitted in batches, or as events corresponding to individual user actions. For example, the data processing system 100 may define an HTTPS GET endpoint, in which case an event may be transmitted to the data processing system 100 for each user action performed on one of the user devices 102 via an HTTPS GET request with query parameters containing the user action data. The data processing system 100 may be configured to respond to the requests with a 403-status code response. In this way, data encryption in transit may be supported.

The user device 102 further includes a software engine 118 responsible for managing the provision of model data 120 and virtual camera data 121 to the rendering engine 116, and for processing and storing user action data 124 generated from user actions performed via the input devices 114, as will be described in more detail hereafter. The model data 120, virtual camera data 121, and user action data 122 are stored in memory 124, which in the present disclosure encompasses both volatile and non-volatile memory and storage devices. It will be appreciated that the user device 102 may include additional functional components not shown in FIG. 1, for example additional output devices such as audio devices and/or haptic feedback devices.

The model data 120 includes code representing a three-dimensional model for rendering in a three-dimensional environment. The model may include a polygon mesh formed of a set of connected polygons arranged to represent the surface of a three-dimensional structure, along with data for mapping textures and/or other digital objects to regions of the polygon mesh. A range of software libraries exist for generating a polygon mesh to represent a given geometrical structure, for example those defined in the Three.js JavaScript™ library or those used in the MeshLab™ software suite. In present example, the polygons of the model are triangles, which can be used to generate a model of any surface and have the advantage that GPUs are optimised to perform computations based on triangles rather than other types of polygon, resulting in improved efficiency and speed of rendering. The model data 120 may also include data for controlling lighting, animation, and other effects.

The rendering engine 116 is arranged to render the three-dimensional model in dependence on the virtual camera data 121. For each rendered frame, the virtual camera data 121 defines values of one or more parameters of a virtual camera, which may be positioned within the same three-dimensional environment as the three-dimensional model. The parameters of the virtual camera may control a position and orientation of the virtual camera with respect to a given reference frame, along with an angle or angles subtended by a field of view of the virtual camera. Alternatively, the virtual camera may have a fixed position and orientation, and the virtual camera data 121 may instead control a position and orientation of the three-dimensional model with respect to the virtual camera. The virtual camera data 121 thereby determines which portions of the three-dimensional model (for example, which polygons of the three-dimensional model) are rendered, along with their respective positions, orientations, and scales. The virtual camera may be controllable by user actions received via the input devices 114, meaning that the virtual camera data 121 may be updated in response to those user actions.

In this example, the model data 120 is commonly provided as a web resource to multiple user devices, including the user device 102, and may be accessed via each of the user devices using a web browser or dedicated software application. The model may for example be rendered within a <canvas> element of an html5 web page using the Three.js JavaScript application programming interface (API). The Three.js API has been developed specifically for generating animated three-dimensional graphics for rendering by a web browser, and make uses of the lower-level Web Graphics Library™ (WebGL) API which enables GPU-accelerated graphics rendering as part of a <canvas> element of a web page. In other examples, a mesh representation of a surface may be rendered using a plug-in or dedicated software application.

Objects may be mapped to one or more surfaces of the three-dimensional model, for example using texture mapping techniques. During texture mapping, the objects are first arranged in a two-dimensional plane (referred to as a texture space). An unfolded net of polygons forming the three-dimensional model is then overlaid on the two-dimensional plane containing the objects. During rendering, points within a given polygon of the three-dimensional model are coloured or "painted" by interpolating between the positions of the polygon's vertices in the two-dimensional plane, and sampling the colours of the objects appearing at the interpolated positions in the two-dimensional plane. The objects may be static or animated, and may be interactive, for example exhibiting certain behaviours in response to user input such as clicking or in dependence on the position and/or orientation of the virtual camera relative to the model. The objects may for example represent products in an online retail environment, and accordingly be associated with meta-data representing characteristics or attributes of those products, such as price, description, taxonomy, related products, and so on. Alternatively, or additionally, objects may represent assets associated with one or more advertising campaigns, in which case meta-data may indicate a brand, campaign identifier, and so on.

The data processing system 100 may be a standalone server or may be a networked system of servers, for example a distributed server system for performing cloud-based services on behalf of users. The data processing system 100 in this example is operated by a commercial entity responsible for managing the distribution of digital content to end users. The commercial entity may for example be an online retailer or a service provider managing distribution of digital content on behalf of one or more clients. Accordingly, the data processing system 100 may expose one or more application programming interfaces (APIs) 128 for communicating with one or more client systems.

The data processing system 100 includes storage 126 for storing user action data in a raw, unprocessed format, referred to hereinafter as raw user action data. The raw user action data may for example be stored in the form of individual user action events each corresponding to an individual user action received by a user device. The raw user action data may be stored in a set of in access log files (such as CloudFront™ access logs) in a cloud-based Simple Storage Service™ (S3) bucket hosted by Amazon Web Services™ (AWS). Each access log file may include user action events received from user devices within a fixed time period (for example within a given hour). The access log files may be stored in encrypted or unencrypted form, depending on the sensitivity of the user action data contained therein.

The data processing system 100 further includes processors 124 configured to process the raw user action data. User action data stored in access log files may for example be fetched for processing by jobs implemented using AWS Glue™. These jobs may be scheduled and chained using AWS Step Functions™. An exemplary three-stage processing pipeline includes a validation job, followed by an enrichment job, followed by an aggregation job. The validation job checks each user action event against a defined schema to ensure that all required data is present and in the correct format. The enrichment job may append additional information to user action events, for example metadata identifying the three-dimensional model (which may be stored at the data processing system 100), and user or session identifiers.

The aggregation job is used to aggregate user action events in order to determine distributions of user focus on the three-dimensional model. The user action events may be aggregated over a range of variables, including selected time periods, device types, user identifiers, and so on. The aggregation is typically performed automatically by the data processing system 100, and the resulting distributions may be provided to users accessing the data processing system 100 via the APIs 128. Further details of the aggregation job are provided hereinafter.

Figure 2:
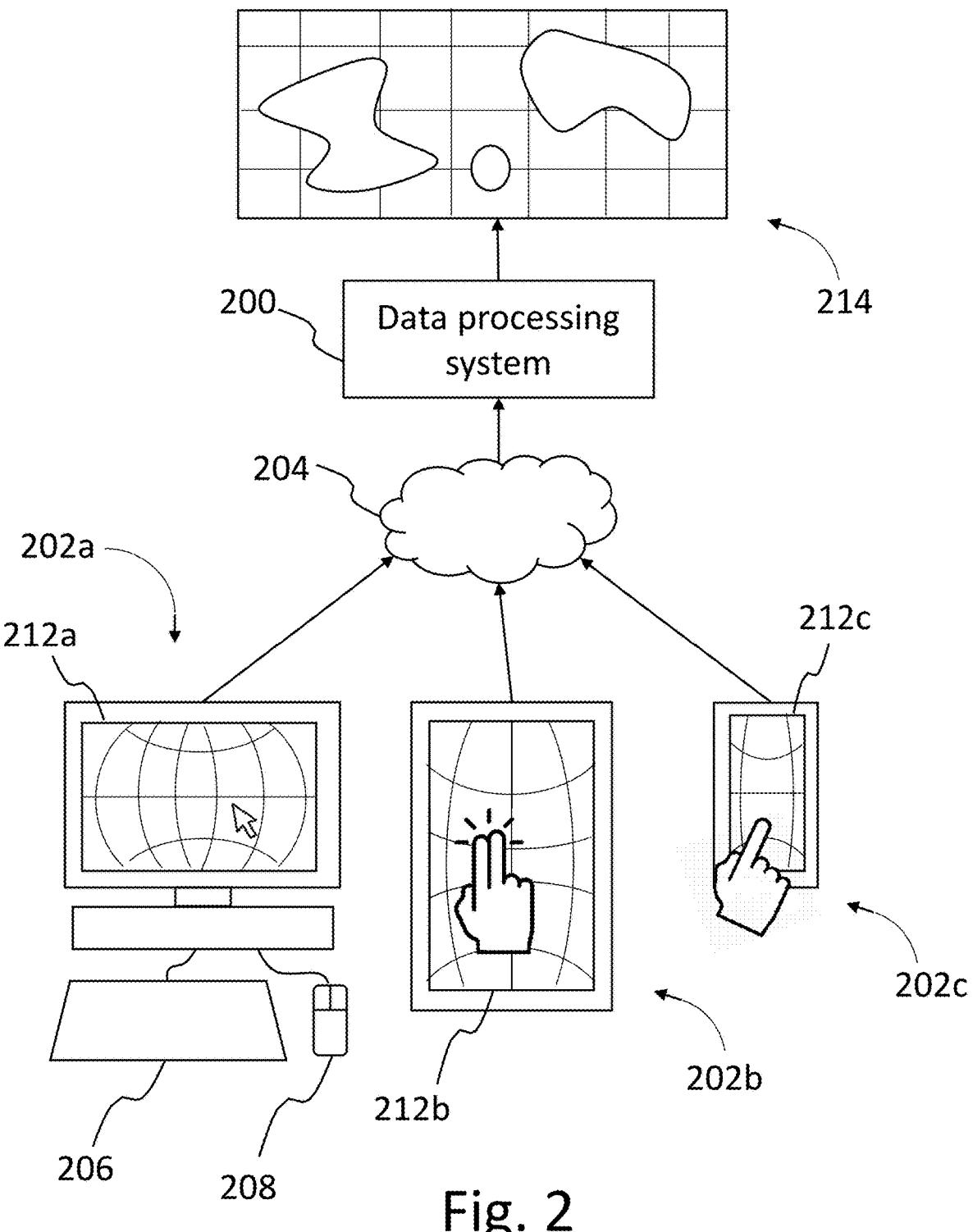
FIG. 2 illustrates a method tracking of user focus by users of multiple user devices.

FIG. 2 shows an example in which a data processing system 200 (which may include similar components to the data processing system 100 of FIG. 1) has the task of determining a distribution of user focus on a set of objects displayed to a large number of users. The objects may for example represent products in the context of an online retail environment, such that the distribution of user focus can be used to gain insights into relative levels of user interest in the products. Known methods of gaining such information would involve presenting the objects to users in a two-dimensional configuration on one or more web pages, then tracking pageviews, clicks, and/or cursor position. Such approaches have drawbacks as discussed above. According to the present disclosure, the set of objects is instead mapped to one or more surfaces of a three-dimensional model. The three-dimensional model in this example is substantially sphere-shaped (i.e. spherical, spheroid, or formed of spherical or similarly-shaped portions with rotational symmetry about at least one axis), and the objects are mapped to a concave interior surface of the model. Examples of methods of presenting objects on a surface of a substantially sphere-shaped model are provided in international patent publications WO 2011/151367 A1 and WO 2022/003066 A1, both of which are incorporated herein, in their entirety, by reference.

Data representing the three-dimensional model and the object mappings is provided to multiple user devices, referred to collectively as user devices 202, of which three user devices 202*a*, 202*b* and 202*c* are shown. Each of the user devices 202 includes a respective display device 212*a*, 212*b*, 212*c* on which the model is rendered from a perspective of a virtual camera. The virtual camera in this example has a field of view containing a portion of a concave interior surface of the model. Texture mapping is used to map the objects from a texture space to the interior surface of the model for rendering.

Different portions of the three-dimensional model are displayed on different user devices 202, depending on the positions and orientations of different instances of the virtual camera, and further depending on the viewport dimensions of the user devices 202. A viewport is a display or a portion of a display in which information is presented and can be viewed. In the present example, the viewport of each of the user devices 202 includes substantially the entire display of that user device 202, though in other examples a viewport may cover only a portion of a display, for example a browsing window on a webpage or graphical operating system. The viewport dimensions may vary between the user devices 202. For example, the user device 202*a* is a desktop computer, and therefore has a landscape aspect ratio and relatively large display area. The user device 202*b* is a tablet computer being used in portrait orientation, and has a smaller display area than that of the desktop computer. The user device 202*c* is a smartphone being used in portrait orientation, and has a smaller display area than that of the tablet computer. Due to the differing viewport dimensions, different portions of the three-dimensional model are rendered on the different user devices 202 (the interior surface of the three-dimensional model is represented in FIG. 2 using curved gridlines).

Each of the user devices 202*a*, 202*b*, 202*c* has one or more input devices arranged to receive user actions for controlling the virtual camera on that user device. In this example, the user device 202*a* has a keyboard 206 and mouse 208 for controlling an on-screen cursor, whereas the display devices 212*b*, 212*c* of the user devices 202*b*, 202*c* are touch screens arranged to receive user input by human touch and accordingly do not make use of an on-screen cursor. Other examples of input devices include joysticks, trackpads, sliders, gesture detectors and eye trackers (which may include one or more cameras and object detection software).

The fact that different user devices 202*a*, 202*b*, 202*c* have different viewport dimensions and may use different types of input device, some of which may forego use of an on-screen cursor, makes it challenging to track user focus in an accurate and consistent way for multiple users with conventional methods, limiting the insights that can be gained into users' attention, for example in the context of an online retail environment. The present disclosure addresses these challenges by providing a method of tracking user focus that is agnostic to the type of input device and allows the aggregation of data over a large number of users irrespective of the types of user device. As a result of the methods described in detail hereafter, the data processing system 200 is able to generate a distribution of user focus on the three-dimensional model. In this example, the resulting distribution is displayed visually as a heatmap 214 superimposed on a two-dimensional planogram representing the arrangement of objects prior to being mapped to the surface of the three-dimensional model. Areas of higher user attention are displayed with higher "heat" values.

Rather than tracking cursor position in a two-dimensional environment, embodiments described herein determine a spatial distribution of user focus by tracking user actions which control the position of a virtual camera relative to a three-dimensional model. Examples of user actions include move actions, in which the position and/or orientation of the virtual camera is adjusted in relation to the three-dimensional model (or vice-versa). A specific type of move action is a rotational move action in which the virtual camera rotates around an axis (or the three-dimensional model rotates around the virtual camera). The axis may pass through the virtual camera, in which case the rotate action adjusts only the orientation of the virtual camera, or the axis may be set away from the virtual camera, in which case the rotate action adjusts both the position and orientation of the virtual camera. A rotate action may be performed for example by a user pressing a directional arrow on a keyboard, or by dragging a point on the surface of the model in the appropriate direction, either by holding down a button on a mouse or by sliding a finger across a touch screen. In other examples, other types of move actions may be possible, for example a translate action in which a virtual camera moves in a given direction without any rotation.

Figure 3A:
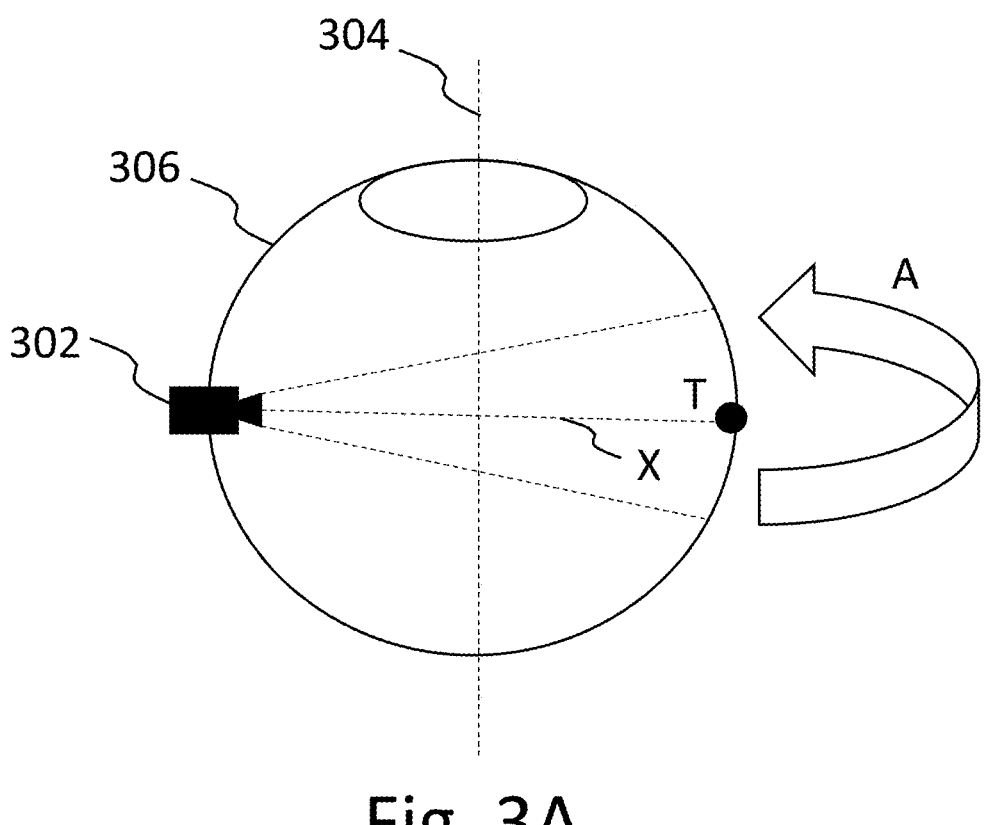
FIG. 3A shows a rotate action performed on a three-dimensional model rendered from a perspective of a virtual camera in response to user input.
Figure 3B:
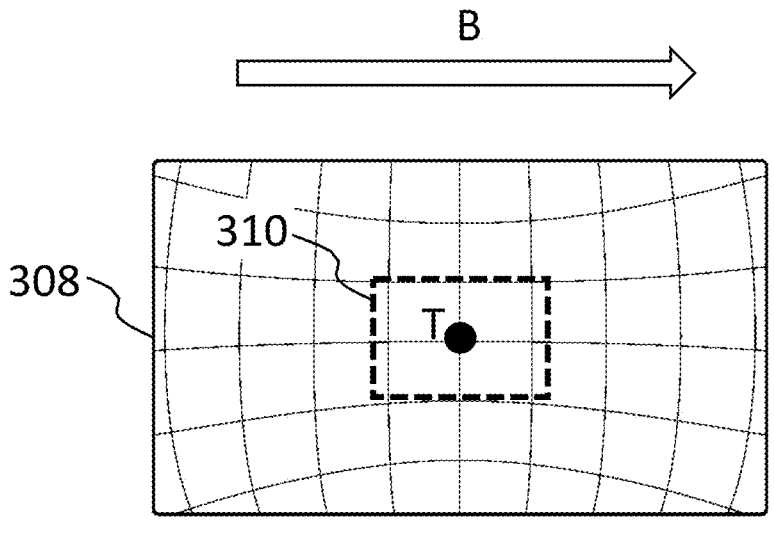
FIG. 3B illustrates the view from the virtual camera of FIG. 2A as the rotate action is performed.

FIG. 3A shows an example of a rotate action in which a virtual camera 302 arranged to view a concave interior surface of a spherical model 304 is rotated in a direction shown by the arrow A, about an axis 306 passing through the centre of the model 304, where the axis 306 is fixed relative to the model 304 (or, equivalently, the three-dimensional model 304 is rotated about the axis 306, which is fixed relative to the virtual camera 302). FIG. 3B illustrates the effect of the rotate action of FIG. 3A in the viewport 308 of a user device when the model 306 is rendered from the perspective of the virtual camera 302. The concave interior surface (represented by curved gridlines), and objects disposed thereon (not shown) move substantially in the direction of the arrow B.

A second type of user action is a zoom action, in which an angle subtended by the field of view of the virtual camera is adjusted and/or the distance of the virtual camera from the three-dimensional model is adjusted in order to increase or decrease the proportion of the viewport occupied by a given portion of the three-dimensional model. A zoom action towards or away from a given point on the model may be performed for example by a user pressing a button on a keyboard or scrolling a scroll wheel on a mouse whilst the cursor at the given point, or performing a pinch action at the given point using two fingers on a touch screen. A zoom action may be characterised by a zoom factor, where a zoom factor of greater than one indicates zooming towards a given point, whereas a zoom factor of between zero and one indicates zooming away from a given point.

Figure 4A:
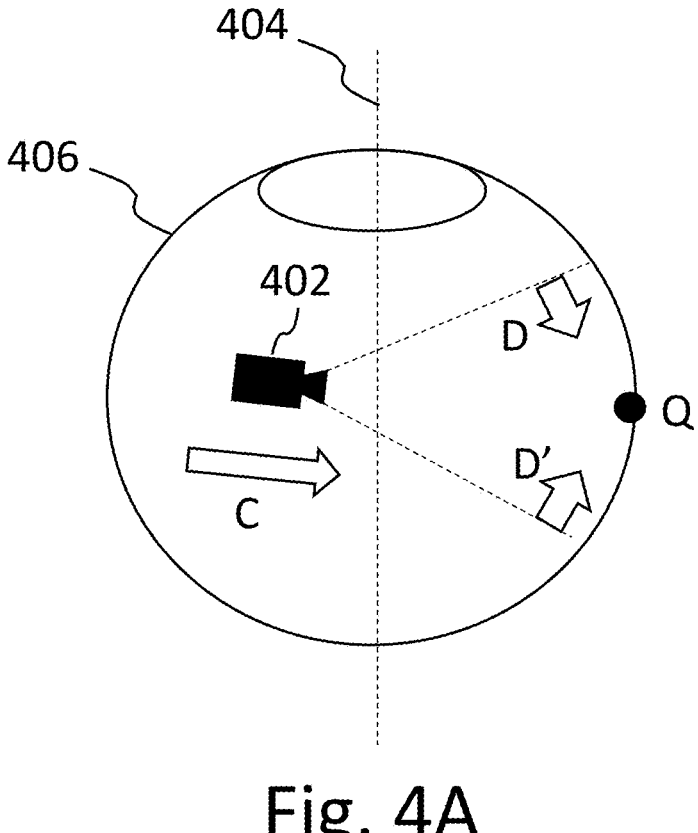
FIG. 4A shows a zoom action performed on a three-dimensional model rendered from a perspective of a virtual camera in response to user input.
Figure 4B:
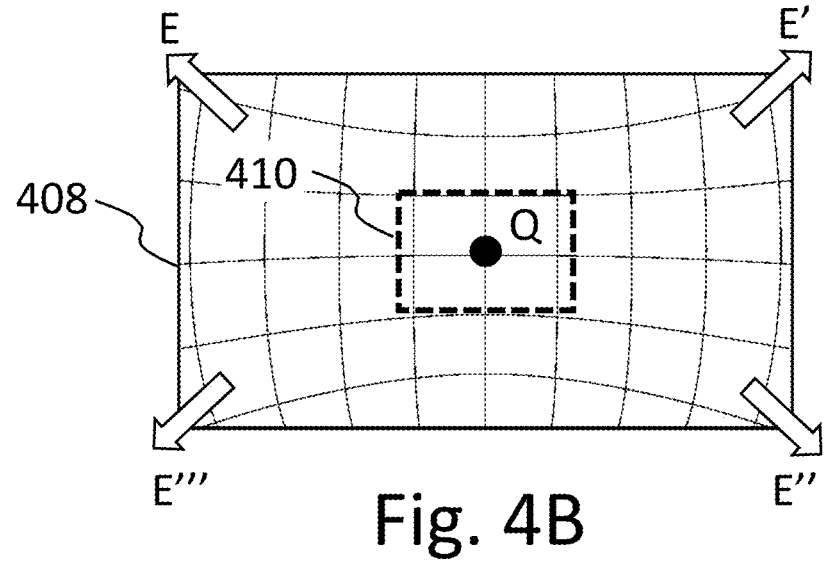
FIG. 4B illustrates the view from the virtual camera of FIG. 3A as the zoom action is performed.

FIG. 4A shows an example of a zoom action in which the virtual camera 402 arranged to view a convex interior surface of a spherical model 404 moves relative to the model 404 in a direction substantially towards a point P on the surface in a direction shown by the arrow C, and narrows its field of view as indicated by the arrows D and D'. FIG. 4B illustrates the effect of the zoom action of FIG. 4A in the viewport 408 of a user device when the model 406 is rendered from the perspective of the virtual camera 402. The surface of the model 404 appears to expand as shown by the arrows E, E', E", E'". In other examples, a zoom action may omit either the movement of the virtual camera or the adjusting of the angle subtended by the field of view, and/or may further include a rotation of the virtual camera. Different zooming algorithms are possible depending on the context. In some examples, if the user zooms far enough towards a given objective point, the surface at the objective point appears at normal incidence at the centre of the field of view of the virtual camera. In this situation, a region of the model immediately surrounding the objective location appears head-on, allowing the user to view the neighbourhood of the objective location with maximum clarity. In order to achieve this, upon receiving the request to perform a zoom action, the virtual camera may move along a path depending on the determined objective point until the virtual camera is positioned on a normal to the model at the determined objective point. The virtual camera is then reoriented to face towards the determined objective location, and the dimension of the field of view of the virtual camera may be decreased so that a smaller portion of the model falls within the field of view of the virtual camera. If further zooming is requested, the virtual camera remains on the normal and the dimension of the field of view is adjusted in accordance with the requested zoom factor.

Figures 5A, 5B, 5C:
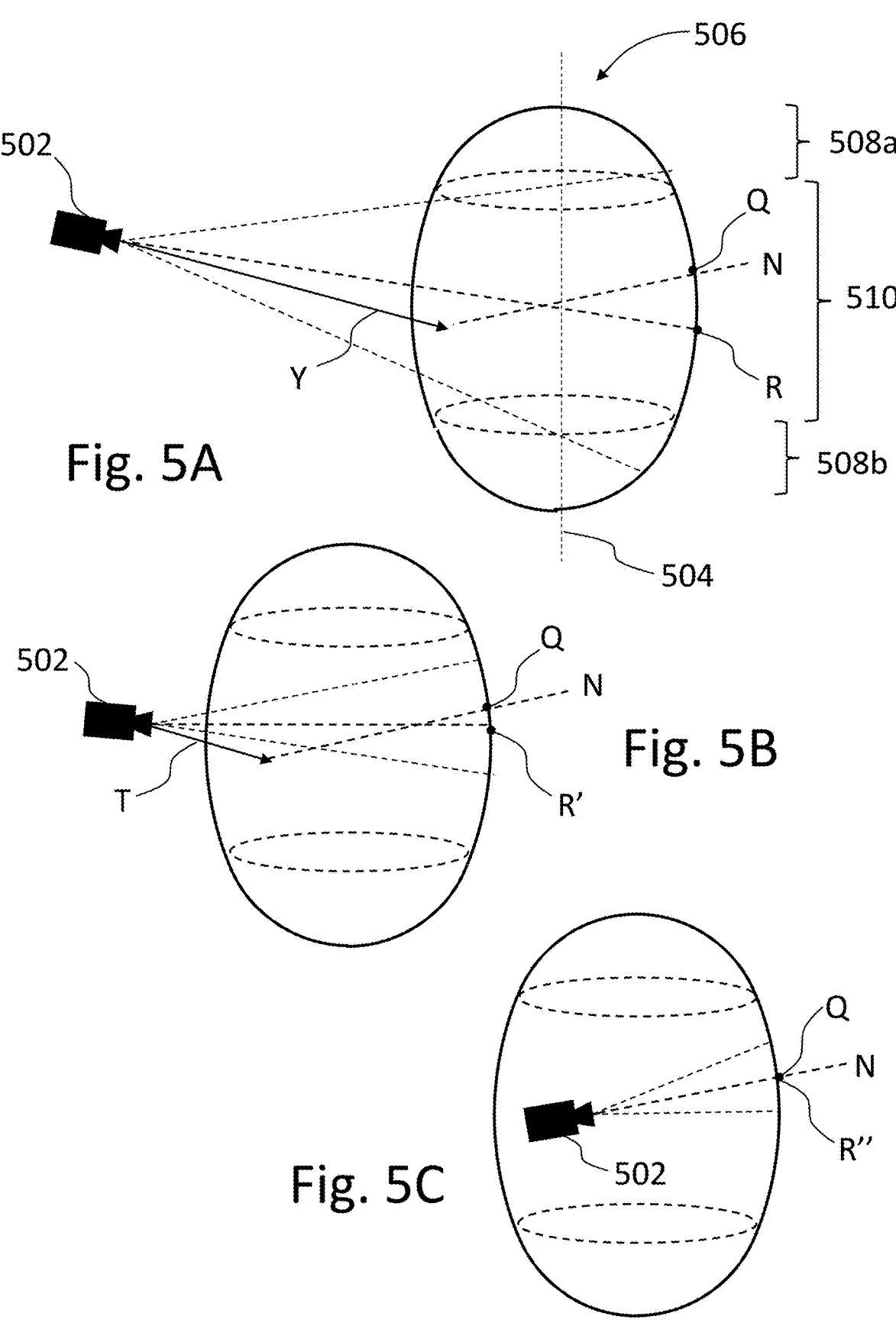
FIGS. 5A-5C show an example of operations performed by a virtual camera viewing a concave interior surface of a model.

FIGS. 5A-5C show an example of operations performed by a virtual camera 502 viewing a concave interior surface of a model 506, in response to a request to zoom received via an input device. The model 506 may be a closed shell with circular symmetry about an axis 504, formed of two curved polar caps 508a, 508b intersecting the axis 504 and a curved equatorial belt 510 connecting the two polar caps 508a, 508b such that there is no discontinuity or kink at the boundaries between the polar caps 508a, 508b and the equatorial belt 510. In this example each of the polar caps 508a, 508b and the equatorial belt 510 has a cross-sectional curvature in a plane containing the axis 504, where the cross-sectional curvature of each of the polar caps 508a, 508b is greater than the cross-sectional curvature of the equatorial belt 510. In FIG. 5A, the virtual camera 502 is positioned exterior to the model 506, but the rendering is configured such that the virtual camera 502 effectively sees through the convex exterior surface of the model 506 to view a concave interior surface of the model 506.

The request to zoom includes an indication of an objective location Q on the interior surface of the model (this may correspond the location of a cursor when the user initiates the zoom action, or a location at which a pinch action is performed). As shown in FIG. 5A, the virtual camera 502 is not initially positioned on the normal N to the model at the objective location Q, meaning that the objective location Q appears at oblique incidence from the perspective of the virtual camera 502.

In response to the request to zoom, the virtual camera 502 moves along a trajectory Y that depends on the objective location Q, whilst rotating such that the target R of the virtual camera 502 moves closer to the objective location Q. In this example, the trajectory Y is a straight line intersecting with the normal N at the objective location Q. The angle which the trajectory Y makes with the normal N is a parameter that may be predetermined. In a further example (not shown here), the trajectory Y and the normal N meet at a right angle, resulting in the shortest possible trajectory that the virtual camera 502 can follow to reach the normal N. The virtual camera 502 continues along the trajectory Y for a distance determined by the requested zoom factor, and the orientation of the virtual camera 502 is adjusted towards the objective location Q. In FIG. 5B, the virtual camera 502 has moved a certain distance along the trajectory Y, but is not yet positioned on the normal N. In FIG. 5C, the virtual camera 502 is positioned on the normal N. At this point, the objective location Q appears at normal incidence at the centre of the field of view of the virtual camera 502. If further zooming is requested, the dimensions of the field of view are narrowed without the virtual camera 502 being further moved or reoriented.

A user action received by a user device may have an associated focal position. The focal position is a point or region on a surface of the three-dimensional model that the user brings, or intends to bring, into a position of maximum viewability by performing the user action. In the case of a three-dimensional model having a curved surface, a position of maximum viewability may for be one at which a normal vector to the surface faces substantially towards the virtual camera, or one for which an angle between the normal vector and the axis of the virtual camera is minimum. At this point, the surface is perpendicular, or nearly perpendicular, to the axis of the virtual camera, and is therefore viewed in a head-on fashion from the perspective of the camera. It will be appreciated that the concept of a point or region of maximum viewability has extra significance for three-dimensional models, where different portions of the model can have different degrees of viewability, even when lying within the same viewport. In other examples (for example when a range of points have equal viewability), a focal position may be a point appearing centrally within the viewport or closest to the centre of the viewport. The focal position for a given user action may be dependent on, and indeed derivable from, the position and/or orientation of the virtual camera relative to the three-dimensional model following the user action, and may also be (implicitly or explicitly) dependent on the geometry of the surface.

In the case of a move action (such as a rotate action), the focal position may be a target of the virtual camera, or in other words an intersection between a surface of the three-dimensional model and an axis of the virtual camera. In the rotate action of FIGS. 3A and 3B, the target T of the virtual camera 302 is an intersection between the axis X of the virtual camera 302 and an interior surface of the model 306. It is observed that a dashed region 310 surrounding the target T appears approximately flat and head-on from the perspective of the virtual camera 302. The user focus following the rotate action may be considered to be concentrated within this region. The position and dimensions of the region 310 depend on the target T, the dimensions of the viewport 308, and the geometry of the model 306. Accordingly, the information pertinent to determining user focus following the rotate action may include the target T and the dimensions of the viewport 308, along with the geometry of the model 306.

In the case of a zoom action, the focal position may be determined as an objective point specified by the user during a request to zoom, or alternatively may be depend on the final position and orientation of the virtual camera following the zoom action. The zoom action of FIGS. 4A and 4B ends with the point P lying at the centre of the viewport, with the surface of the model 406 perpendicular to the axis of the camera at this point. The point P may therefore be considered the focal position following the zoom action. The dashed region 410 surrounding the point Q appears approximately flat and head-on from the perspective of the virtual camera 402. The user focus following the zoom action may be considered to be concentrated within this region. The position and dimensions of the region 410 depend on the point Q, the dimensions of the viewport 408, and the geometry of the model 406.

In the example of FIGS. 5A-5C, the focal position following the zoom action of FIG. 5A to FIG. 5B may be the objective location Q specified by the user when the zoom action is initiated, or may be the target R' of the virtual camera 502 following the zoom action. It is observed that the objective location Q and the target R' in FIG. 5B are close together, but not identical. The focal position following the zoom action of FIG. 5B to FIG. 5C may be the objective location Q or the target R" of the virtual camera 502 following the zoom action, which in this case are identical. Other definitions of the focal position are possible, for example a position on the surface of the model for which the normal is closest to being parallel to the axis of the virtual camera 502 (meaning that the surface will appear head-on at this position). The most appropriate definition of the focal position will depend on the geometry of the model and the choice of zoom algorithm.

Figure 6:
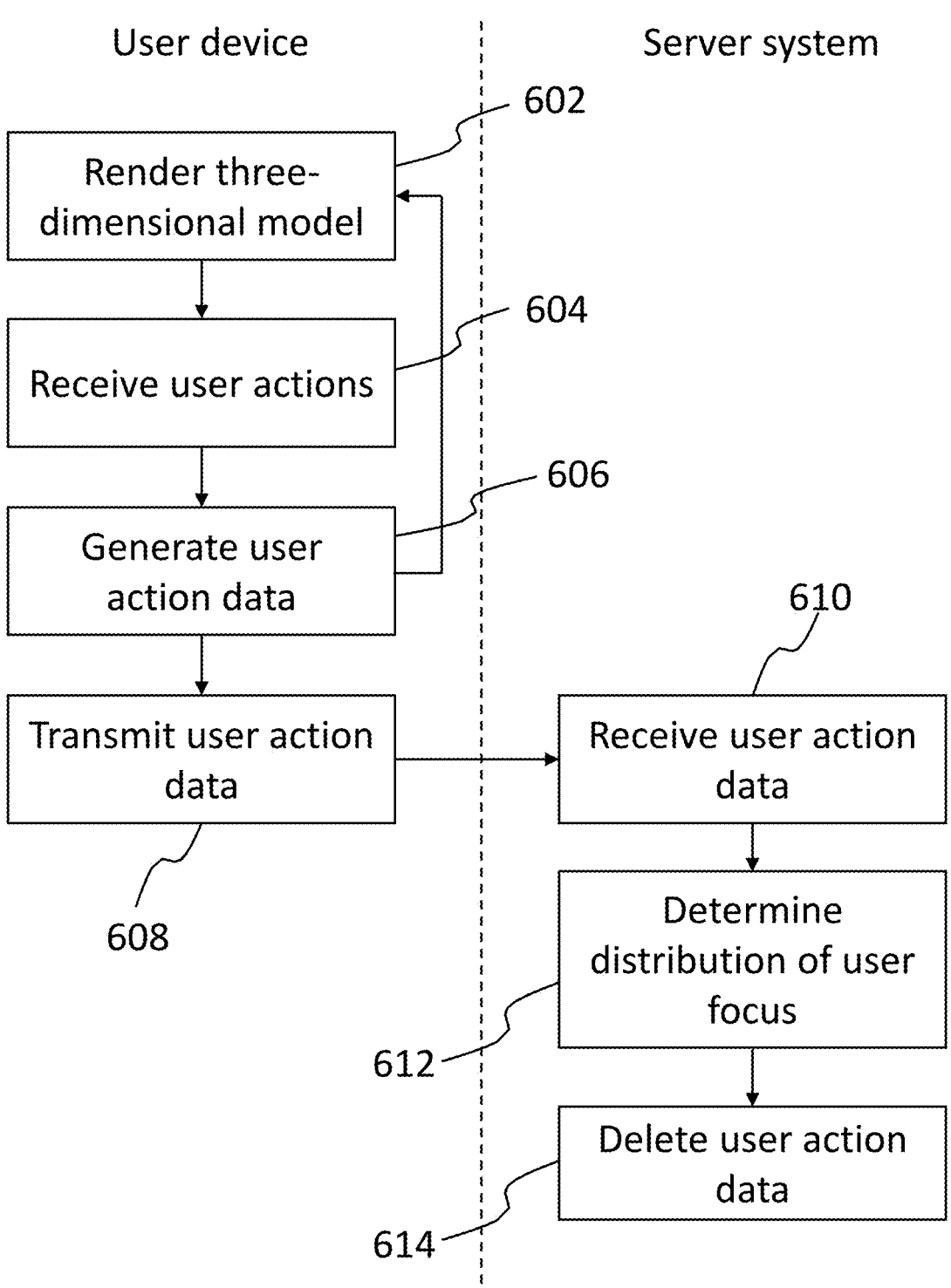
FIG. 6 is a flow diagram representing a method of tracking user focus in a digital environment.

FIG. 6 shows an example of a method of tracking user focus in a digital environment. Prior to the method of being carried out, a three-dimensional model is commonly provided to a plurality of user devices. The model may for example be simultaneously transmitted to the user devices, accessed as a web resource, or otherwise loaded onto the user devices during or after manufacture. The steps on the left of the dashed line are performed by one of the user devices, and similar steps are performed by the other user devices, asynchronously and in dependence on user input. The steps on the right of the dashed line are performed by server system connected to user devices over a network.

The user device renders, at 602, the three-dimensional model on a display. The model is rendered from a perspective of a virtual camera within a viewport which may include the whole or part of the available screen space of the display device. The model may include a polygon mesh and mapping data for mapping visual elements to one or more surfaces of the polygon mesh. In some examples, a large image or texture may be mapped in its entirety to one or more surfaces of the polygon mesh. The model may be provided with one or more images at various levels of detail for rendering in dependence on a zoom level of the virtual camera. The model or the environment in which the model is rendered may be stationary or may include one or more dynamic effects, such as dynamic lighting or motion effects. The model may include video elements mapped to one or more surfaces of the model. The rendering may be performed using any appropriate rendering technique(s), such as rasterization and/or ray tracing.

Whilst rendering the three-dimensional model, the user device receives, at 604, a user action via one or more input devices. The user action controls aspects of the rendering of the three-dimensional model, such as the relative position and/or orientation of the virtual camera relative to the model, and/or the angle subtended by the field of view of the virtual camera. The user action may for example be a move action or a zoom action as described above.

The user device generates, at 606, user action data indicating the user action received at 604 whilst rendering the three-dimensional model. The user action data may include a focal position associated with the user action, along with an indication of the type of user action. Other data may be included for specific types of user action, for example a direction of rotation in the case of a rotate action, enabling different rotations ending in the same focal position to be distinguished. The user action data may further indicate a zoom level from which the portion of the three-dimensional model falling within the viewport can be determined following the performing of the user action. In some cases, different levels of detail may be rendered in dependence on the zoom level (for example, different resolutions of images or different objects entirely), in which case the indicated zoom level may be used to determine what is actually visible on a given portion of the model.

The user device continues to render the three-dimensional model, frame by frame, in dependence on user actions received from the one or more input devices, and continues to generate user action data corresponding to the received user actions. The user device then transmits, at 608, the generated user action data to the server system. As explained above, the user device may transmit the user action data in the form of individual events, with each event corresponding to a previous action, or may temporarily store the user action data for transmission in batches. In addition to the focal position, user action type, and other information discussed above, the user action data for a given user action may further indicate a time period between the given user action and the next user action. This may correspond to the time period for which the model appears stationary in the viewport of the user device, which may be relevant for determining user focus levels as explained hereinafter. In addition to the user action data, the user device may further transmit viewport data indicating viewport dimensions and/or a device type for each of the plurality of user devices. The user device may further transmit data identifying the three-dimensional model or a particular version of the three-dimensional model, such as a numerical model identifier and version identifier. This may be important for example if different models, or different versions of the model, are provided to different user devices at a given time. Furthermore, users may interact with a digital environment in which several three-dimensional models are present, and may be able to navigate between the models. Different versions of a model may for example correspond to different arrangements of objects being mapped to the model's surface, which may result from processing of user action data by the server system, as explained in more detail hereinafter.

The server system receives, at 610, the user action data from the user device. In an example, the user action data is received from multiple user devices in the form of individual events and stored in log files corresponding to respective time periods prior to processing. Those skilled in the art will appreciate that other options are possible for storing user action data.

The server system determines, at 612, a spatial distribution of user focus on the three-dimensional model, by aggregating the user action data received from the user devices. The user action data may be aggregated separately for various characteristics such as device type, geographical region, and so on, to generate separate spatial distributions for different variants of the characteristics. These spatial distributions may then be further aggregated (e.g. added or averaged) to determine aggregated spatial distributions. For example, separate distributions may be generated for each device type within a given geographical region, and these may be aggregated to generate a distribution for all device types in the given geographical region. The resulting distribution may be further aggregated with distributions from other geographical regions to generate an overall spatial distribution of user focus for all device types in all regions. In some examples, user actions are associated with a user identifier and/or a session identifier. A user identifier is common to all user actions performed by a given user, whereas a session identifier is common to all user actions performed by a given user during a single session of interacting with the model (analogous to a single browsing session in the context of Internet browsing). These identifiers may be provided by the user devices or may be added during an enrichment pipeline implemented by the server system. The user identifier and/or session identifier may be used to determine further.

An method of determining a spatial distribution of user focus on a three-dimensional model involves dividing the surface of the model (or on a two-dimensional plane mapped to the surface of the model) into grid squares at a given resolution, and a value determined for each grid square indicating of a level of user focus on that grid square over a given period of time. The grid squares may initially be assigned a value (such as zero) corresponding to zero user focus, and each user action indicated within the given period of time may increase the user focus on certain grid squares. For example, a maximum value may be added to the grid square containing the focal position of the user action, then a lower value added to grid squares immediately neighbouring the focal position, then lower values to grid squares further away from the focal position, dropping to zero for grid squares far from the focal position, including at least those not falling within the viewport following the user action. The contribution of a given user action to the spatial distribution of user focus may be characterised by a filter or kernel, which is a matrix of numerical values indicating the contribution of the user action to the user focus on each grid square.

The contribution to the spatial distribution of user focus, for example the values and domain of influence of a filter or kernel, may depend on the viewport dimensions of the user device, the zoom level following the user action, and/or the type of user action. For the user actions of FIGS. 3B and 4B, the contribution to the grid squares inside the regions 310 and 410 may be higher than the contribution to the grid squares outside the regions 310 and 410. The shapes and sizes of these regions depend on the viewport dimensions (e.g. the aspect ratio) and the respective zoom levels. The contribution to the grid squares inside these regions may be uniform, or may vary such as by decreasing away from the centre of the regions.

The contribution to the spatial distribution of user focus may further depend on the time between a given user event and the next user event performed on the same user device. The time between successive user events may correspond to the time period for which the model appears stationary within the viewport. The focus level of an individual user may be considered to increase with this time period, for example proportionally up to a predetermined saturation time (for example 10 seconds, 20 seconds, a minute, or any other suitable period of time depending on the specific use case), during which it is assumed that the user is continuing to view the model. After the saturation time, it is no longer assumed that the user is still viewing the model and therefore the focus level stops increasing.

Although determining the spatial distribution of user focus has been described above with reference to the application of a kernel to a matrix of values corresponding to grid squares on a surface of the model, it will be appreciated that other methods of determining a spatial distribution are possible. For example, a set of points may be distributed around the focal position for a given user action, for example with a maximum density immediately surrounding the focal position and decreasing away from the focal position. The locations of the points may then be used to determine parameters of a continuous spatial distribution for the points assuming the points are generated according to a random spatially varying process such a Poisson process. Other methods of generating heatmaps from distributions of points, such as simple histogram-based methods, are known in the art and could equally be used here.

Returning to FIG. 6, the server system may delete, at 614, the raw user action data received from the user device. For large numbers of users, the amount of user action data, corresponding to every user action performed by every user, may be very large. The spatial distribution data, which may be stored for example in a relational database, can be made far more compact, particularly if the resolution is not too high, and may contain all of the information of interest.

The spatial distribution of user focus determined at 612 may correspond to user actions performed within a particular time period, for example within a particular hour. A series of spatial distributions may be determined, each corresponding to a different time period, from which temporal variations in user focus may be identified. These temporal variations may be correlated with events, such as times of day, days of the week, public holidays, and so on. Furthermore, several spatial distributions may be determined over respective different periods of time (for example, a separate distribution for each hour), and these may be aggregated (e.g. summed or averaged) over the respective different periods of time to generate time-aggregated spatial distributions. For example, spatial distributions corresponding to 24 hours may be aggregated to generate a spatial distribution of user focus in a day. This may be performed for each day (e.g. starting at 00:00 and ending at 23:59.59), or may be performed as a moving average. Efficient methods of computing moving averages are well-known and may be used here. Similarly, spatial distributions corresponding to a given number days may be aggregated to generate a spatial distribution of user focus in a week, month, or year. Nested aggregation may be performed to allow variations to be identified at various levels of temporal granularity.

Figures 7A, 7B, 7C:
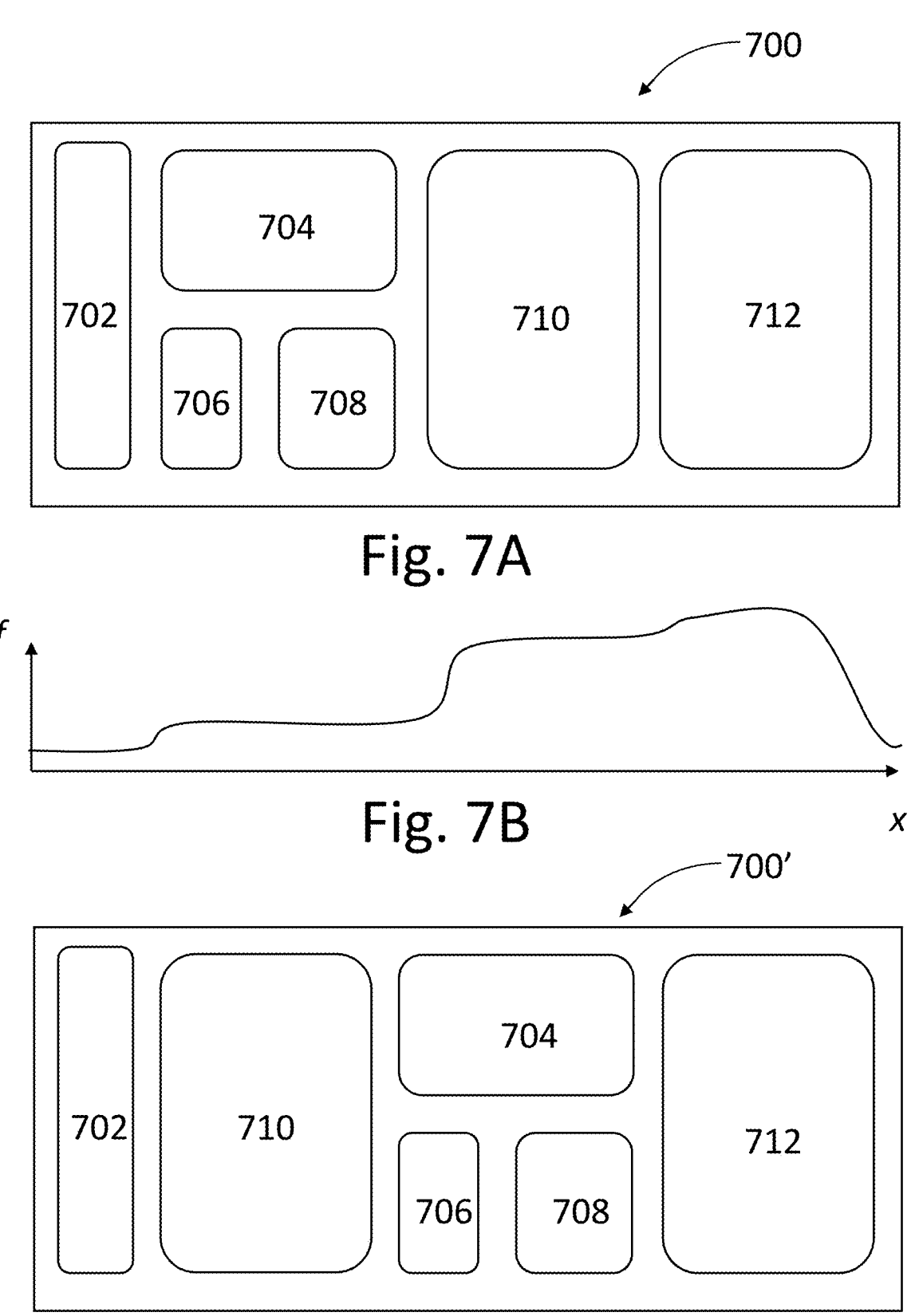
FIG. 7A shows an initial arrangement of a set of objects for mapping to a three-dimensional model.
FIG. 7B shows a distribution of user focus across the set of objects of FIG. 7A in one dimension.
FIG. 7C shows an updated arrangement of the set of objects of FIG. 7A for mapping to a three-dimensional model.

As explained above, spatial distributions of user focus determined using the methods described herein enable valuable insights to be gained into levels of user interest in particular items. Such insights may be gained from a visual representation of the data such as a heatmap, or may be gained using further automated processing of the distribution data, such as processing the distribution data using one or more machine learning models. FIG. 7A shows an example of a two-dimensional planogram 700 for mapping to a surface of a three-dimensional model. In this example, the planogram is mapped to an interior surface of a substantially sphere-shaped model using a two-square mapping. The planogram 700 includes several objects arranged in clusters 702, 704, 706, 708, 710, 712. When mapped to the sphere-shaped model, the planogram wraps around a vertical axis to enable continuous scrolling with clusters 702 and 712 appearing next to one another. The planogram 700 may be represented at several levels of detail (not shown) such that different information is visible when the three-dimensional model is viewed at different zoom levels.

FIG. 7B is a graph showing the variation of user focus f with position x along the horizontal axis of the planogram 700 for a large number of users (where the user focus f is summed over the vertical position), determined using the methods described herein. It is observed that the user focus f is highest around the cluster 712, slightly lower around cluster 710, still lower around clusters 704, 706, 708, and lowest around cluster 702. In this example, it is observed that the clusters which receive most attention from users are next to one another and therefore concentrated on one side of the three-dimensional model. In the context of an online retail environment, in which the clusters of objects correspond to different categories of objects or objects sharing a common characteristic, it may be undesirable for the clusters to be arranged in this way. Having the most popular items located on one region of the model may result in fewer users viewing items on other parts of the model, particularly if the less popular items are more profitable or if there is a specific reason for wanting to sell more of the less popular items, such as due to suppliers of the less popular items paying a premium rate for advertising their products.

In order to mitigate the undesirable effects described above, it may be advantageous to generate a new planogram in which the clusters which receive the most user focus are evenly spaced around the three-dimensional model. FIG. 7C shows such a planogram 700', in which the clusters 710 and 712, which previously received the most user focus, have been relocated to positions which are mapped to opposite sides of the three-dimensional model. Such an arrangement may increase the levels of user focus on the clusters 702, 704, 706, 708. Although in this example objects are rearranged in clusters, in other examples objects may be rearranged on an individual basis.

The rearranging of the planogram may be performed manually by a human user based on the determined distribution of user focus. For example, a user accessing the server system via an API may view a heatmap representation of the distribution in an interactive graphical user interface via which the user can drag and drop individual objects or clusters. Alternatively, the rearranging may be performed automatically using a rules-based algorithm or a machine learning algorithm. In this regard, the server system may determine a modified configuration of objects for mapping to the three-dimensional model using the determined spatial distribution of user focus on the three-dimensional model. The server system may then transmit data to at least some of the user devices indicating the updated configuration for rendering on those input devices. The updated configuration may be stored at the server system as an updated version of the model. The transmitted data may indicate coordinates representing new locations of at least some of the objects in the planogram, or alternatively may include image data representing the updated planogram, possibly at various levels of detail.

The processing of the distribution of user focus to determine a modified configuration of objects may be determined using machine learning techniques. For example, a reinforcement learning agent may be trained to perform actions that result in a rearranging of objects or clusters of objects, for which a reward signal is generated based on predetermined criteria (e.g. dependent on the positions of the objects), or based on additional such as revenue data associated with the objects in a case where the objects represent products for sale in an online retail environment. Alternatively, a generative model may be trained, for example using adversarial training, to generate new arrangements of objects having desirable characteristics. Deep neural network models may be utilised, which are able to uncover rich patterns within data and determine new arrangements of objects with desirable characteristics having greater efficacy than a human designer.

At least some aspects of the examples described herein with reference to FIGS. 1-7 comprise computer processes performed in one or more processing systems and/or processors. However, in some examples, the disclosure also extends to computer programs, particularly computer programs on or in an apparatus, adapted for putting the disclosure into practice. The program may be in the form of non-transitory source code, object code, a code intermediate source and object code such as in partially compiled form, or in any other non-transitory form suitable for use in the implementation of processes according to the disclosure. The apparatus may be any entity or device capable of carrying the program. For example, the apparatus may comprise a storage medium, such as a solid-state drive (SSD) or other semiconductor-based RAM; a ROM, for example, a CD ROM or a semiconductor ROM; a magnetic recording medium, for example, a floppy disk or hard disk; optical memory devices in general; etc.

The above embodiments are to be understood as illustrative examples. Further embodiments are envisaged. For example, the three-dimensional models provided to a set of user devices may be dynamic, meaning that locations and characteristics of objects appearing on the model may vary whilst the user interacts with the model, for example in response to user input or in response to user focus measured locally at the user device. In such cases, user action data may further include information relating to a current arrangement of objects. User action data may indicate distances from the focal position of a user action to objects appearing on the three-dimensional model, from which insights can be gained into interest levels in given objects even if the objects to not appear in the same place across multiple user devices. Furthermore, attention values indicating levels of user attention on given objects or clusters of objects may be computed in dependence on user focus levels at locations in and around the objects or clusters. As mentioned above, different information may be visible at different levels of detail. For example, clusters may be visible at the lowest level of detail, whereas individual objects may be visible at a higher level of detail, and further information relating to individual objects may be visible at the highest level of detail. In this case, the computed attention values may be made to depend on the levels of detail rendered by the user devices when respective user actions are performed. Attention values may be used to measure level of interest in a particular object or set of objects, such as a product or set of products in the context of an online retail environment, or a particular advertising asset. In some commercial models, remuneration may be due by an advertising entity in dependence on a level of attention recorded for an advertising asset (optionally aggregated over multiple three-dimensional models on which the asset is presented).

In a further example, the methods described herein may be used to determine impression data for one or more objects mapped to a surface of the three-dimensional model. Impression data may include, for example, an impression count indicating a number of impressions of a given object.

Similarly to attention values, in certain commercial models, remuneration may be due by an advertising entity in dependence on a number of impressions recorded for an advertising asset.

An impression of an object may be recorded in relation to a user session if certain viewability criteria are satisfied. For example, viewability criteria may specify that a predetermined proportion of the object is visible in the viewport, that the object takes up a predetermined proportion of the viewport, and/or that the object is visible for at least a predetermined amount of time. Impressions may be counted at the server side based on user action data, additionally to, or instead of, determining a distribution of user focus. According to examples described herein, the user action data may include all of the necessary information for determining impression data. Nevertheless, in other examples impressions may be counted at the individual user devices and aggregated at the server side to determine impression data.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the disclosure, which is defined in the accompanying claims.

The invention claimed is:

1. A data processing system for tracking user focus in a digital environment, comprising:
a network interface configured to receive, from each of a plurality of user devices, input data indicating one or more user actions performed via the user device while the user device renders, from a perspective of a virtual camera controlled by said one or more user actions, a three-dimensional model commonly provided to the plurality of user devices,
wherein the received input data further indicates, for each user action, a focal position on the three-dimensional model relating to a position and/or orientation of the virtual camera relative to the three-dimensional model following the user action; and
one or more processors configured to determine, based at least in part on the received input data, a spatial distribution of user focus on the three-dimensional model, in dependence on the indicated focal positions for the respective user actions, wherein:
a plurality of objects is positioned on the three-dimensional model when the three-dimensional model is rendered by the plurality of user devices;
the one or more processors are further configured to determine, based at least in part on the received input data, impression data indicating a number of impressions of a first object of the plurality of objects, based at least in part on the indicated focal positions for the respective user actions; and
determining the impression data comprises incrementing an impression count upon determining, based at least in part on the indicated focal positions for the respective user actions, that a predetermined set of viewability characteristics are satisfied for one of the plurality of user devices.

2. The data processing system of claim 1, wherein:
the network interface are further configured to receive viewport data indicating viewport dimensions of each of the plurality of user devices; and the one or more processors are configured to determine said spatial distribution of user focus in dependence on the indicated viewport dimensions of each of the plurality of user devices.

3. The data processing system of claim 1, wherein:
for at least one user device, the input data comprises data indicative of time periods between successive user actions; and
the one or more processors are configured to determine said spatial distribution of user focus in dependence on said time periods between successive user actions.

4. The data processing system of claim 1, wherein:
for at least one user device, the input data comprises data indicative of a zoom level following the performance of a given user action; and
the one or more processors are configured to determine said spatial distribution of user focus in dependence on the indicated zoom level following the performance of the given user action.

5. The data processing system of claim 1 wherein:
the three-dimensional model has a concave interior surface; and
the indicated focal position is a point on the concave interior surface.

6. The data processing system of claim 1, wherein the indicated focal position for a given user action is an intersection between a surface of the three-dimensional model and an axis of the virtual camera.

7. The data processing system of claim 1, wherein the plurality of user actions include at least one of:
a zoom action in which a field of view and/or distance of the virtual camera from the three-dimensional model is adjusted; and
a move action in which a position and/or orientation of the virtual camera relative to the three-dimensional model is adjusted.

8. The data processing system of claim 1, wherein:
a plurality of objects is positioned on the three-dimensional model in an initial configuration when the three-dimensional model is rendered by the plurality of user devices; and
the one or more processors are further configured to:
determine a modified configuration of the plurality of objects on the three-dimensional model based at least in part on the determined spatial distribution of user focus on the three-dimensional model; and
transmit, via the network interface, data to one or more of the plurality of user devices indicating the updated configuration of the plurality of objects for rendering on said one or more of the plurality of input devices.

9. The data processing system of claim 1, wherein the one or more processors are configured to:
determine a plurality of spatial distributions of user focus on the three-dimensional model over respective different periods of time; and
aggregate the plurality of spatial distributions over the respective periods of time to generate one or more time-aggregated spatial distributions of user focus on the three-dimensional model.

10. The data processing system of claim 1, wherein the one or more processors are further configured to delete the input data after determining the spatial distribution of user focus on the three-dimensional model.

11. The data processing system of claim 1, configured to transmit the three-dimensional model to each of the plurality of user devices via the network interface.

12. The data processing system of claim 1, wherein:

a plurality of objects is positioned on the three-dimensional model when the three-dimensional model is rendered by the plurality of user devices; and the one or more processors are further configured to determine respective attention values for objects of the plurality of objects based on the determined spatial distribution of user focus on the three-dimensional model.

13. The data processing system of claim 12, wherein:

the three-dimensional model comprises a plurality of levels of detail associated with respective different fields of view of the virtual camera; and the one or more processors are further configured to determine the respective attention values in dependence on levels of detail rendered by the respective user devices following the indicated user actions.

14. A computer-implemented method of tracking user focus in a digital environment, comprising:

receiving, from each of a plurality of user devices, input data indicating one or more user actions performed via the user device while the user device renders, from a perspective of a virtual camera controlled by said one or more user actions, a three-dimensional model commonly provided to the plurality of user devices, wherein the received input data further indicates, for each user action, a focal position on the three-dimensional model relating to a position and/or orientation of the virtual camera relative to the three-dimensional model following the user action; and determining, based at least in part on the received input data, a spatial distribution of user focus on the three-dimensional model, in dependence on the indicated focal positions associated with the respective user actions, wherein:

a plurality of objects is positioned on the three-dimensional model when the three-dimensional model is rendered by the plurality of user devices;

the method further comprises determining, based at least in part on the received input data, impression data indicating a number of impressions of a first object of the plurality of objects, based at least in part on the indicated focal positions for the respective user actions; and determining the impression data comprises incrementing an impression count upon determining, based at least in part on the indicated focal positions for the respective user actions, that a predetermined set of viewability characteristics are satisfied for one of the plurality of user devices.

15. The computer-implemented method of claim 14, wherein:

a plurality of objects is positioned on the three-dimensional model when the three-dimensional model is rendered by the plurality of user devices; and the method comprises determining, based at least in part on the received input data, impression data indicating a number of impressions of a first object of the plurality of objects, in dependence on the indicated focal positions for the respective user actions.

16. The computer-implemented method of claim 15, wherein determining the impression data comprises incrementing an impression count upon determining, based at least in part on the indicated focal positions for the respective user actions, that a predetermined set of viewability characteristics are satisfied for one of the plurality of user devices.

17. A non-transitory storage medium comprising instructions which, when executed by a computer, cause the computer to carry out operations comprising:

receiving, from each of a plurality of user devices, input data indicating one or more user actions performed via the user device while the user device renders, from a perspective of a virtual camera controlled by said one or more user actions, a three-dimensional model commonly provided to the plurality of user devices, wherein:

a plurality of objects is positioned on the three-dimensional model when the three-dimensional model is rendered by the plurality of user devices; and the input data further indicates, for each user action, a focal position on the three-dimensional model relating to a position and/or orientation of the virtual camera relative to the three-dimensional model following the user action; and determining, based at least in part on the received input data, impression data indicating a number of impressions of a first object of the plurality of objects, in dependence on the indicated focal positions for the respective user actions, wherein determining the impression data comprises incrementing an impression count upon determining, based at least in part on the indicated focal positions for the respective user actions, that a predetermined set of viewability characteristics are satisfied for one of the plurality of user devices.

18. The non-transitory storage medium of claim 17, wherein the operations further comprise determining, based at least in part on the received input data, a spatial distribution of user focus on the three-dimensional model, in dependence on the indicated focal positions associated with the respective user actions.

* * * * *